US012806761B2

(12) United States Patent
Beard, III et al.

(10) Patent No.: US 12,806,761 B2
(45) Date of Patent: Nov. 24, 2026

(54) METHOD TO MODIFY A PROGRAM FOR ROBOTIC WELDING

(71) Applicants: James Walter Beard, III, Cookeville, TN (US); Stephen Lee Canfield, Cookeville, TN (US); Stephen Giovanni Zuccaro, Cookeville, TN (US)

(72) Inventors: James Walter Beard, III, Cookeville, TN (US); Stephen Lee Canfield, Cookeville, TN (US); Stephen Giovanni Zuccaro, Cookeville, TN (US)

( * ) Notice: Subject to any disclaimer, the term of this patent is extended or adjusted under 35 U.S.C. 154(b) by 1224 days.

(21) Appl. No.: 17/180,734

(22) Filed: Feb. 20, 2021

(65) Prior Publication Data

US 2021/0260750 A1 Aug. 26, 2021

Related U.S. Application Data

(60) Provisional application No. 62/979,938, filed on Feb. 21, 2020.

(51) Int. Cl.
*B25J 9/00* (2006.01)
*B25J 9/16* (2006.01)
(Continued)

(52) U.S. Cl.
CPC ........... *B25J 9/0081* (2013.01); *B25J 9/1664* (2013.01); *B25J 13/02* (2013.01); *B25J 13/088* (2013.01);
(Continued)

(58) Field of Classification Search
CPC ...... B25J 9/0081; B25J 9/1664; B25J 9/1656; G05B 19/4083; G05B 19/4099; G05B 19/401; G05B 19/0426; G05B 19/19; G05B 19/42; G05B 19/423; G05B 19/425; G05B 19/427; G05B 2219/36041; G05B 2219/36042; G05B 2219/36043; G05B 2219/36046; G05B 2219/36048; G05B 2219/36068; G05B 2219/36081;
(Continued)

(56) References Cited

U.S. PATENT DOCUMENTS

2006/0069464 A1* 3/2006 Nagatsuka ........... G05B 19/425 700/253
2007/0299557 A1* 12/2007 Watanabe .............. B25J 9/1656 700/250
2019/0160662 A1* 5/2019 Satou ....................... B25J 9/163

OTHER PUBLICATIONS

User394255 et al., "types of distances between points," Jan. 12, 2017, https://math.stackexchange.com/questions/2095431/types-of-distances-between-points (Year: 2017).*

* cited by examiner

*Primary Examiner* — Spencer D Patton

(57) ABSTRACT

The invention describes a method to train and edit robot programs without the need to directly interact with the robot program or code. An algorithm then is used to find the nearest program point in the existing program to the current robot end effector position. The operator can delete that point by pressing an appropriately labeled button. The operator could also add positions by first finding an edit point in the program using the manual move near the edit point and then running the search algorithm. In this manner, the weld technician is not required to interact with code that defines the robot program but rather work with the end effector to spatially position the end-effector and edit the program.

7 Claims, 14 Drawing Sheets

Robot selects the desired program point for editing

(51) Int. Cl.
*B25J 13/02* (2006.01)
*B25J 13/08* (2006.01)
*G05B 19/19* (2006.01)
*G05B 19/42* (2006.01)
*B25J 11/00* (2006.01)

(52) U.S. Cl.
CPC ............. *G05B 19/19* (2013.01); *G05B 19/42* (2013.01); *B25J 11/005* (2013.01); *G05B 2219/36042* (2013.01); *G05B 2219/36043* (2013.01); *G05B 2219/36046* (2013.01); *G05B 2219/36505* (2013.01)

(58) Field of Classification Search
CPC ........... G05B 2219/36082; G05B 2219/36083; G05B 2219/36503–36505; G05B 2219/36507
See application file for complete search history.

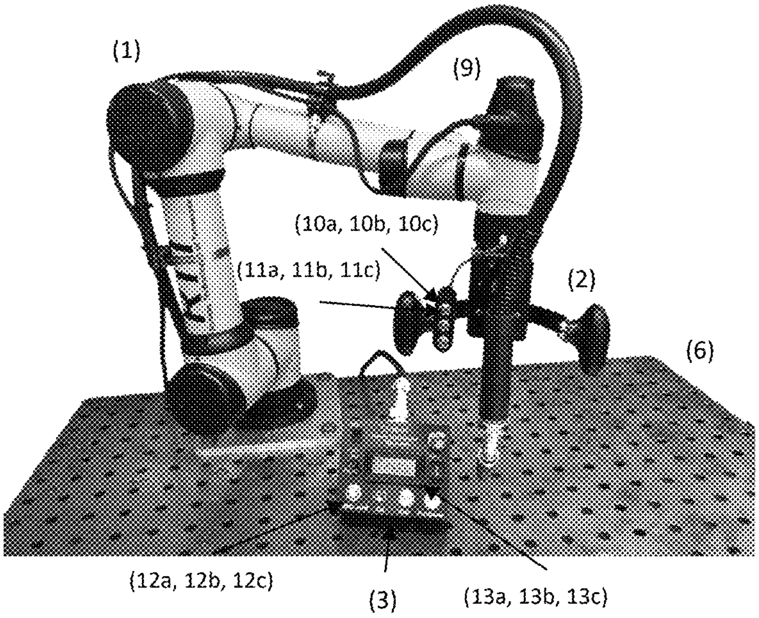
Figure 1: Robot with lead-through handle, torch and input units

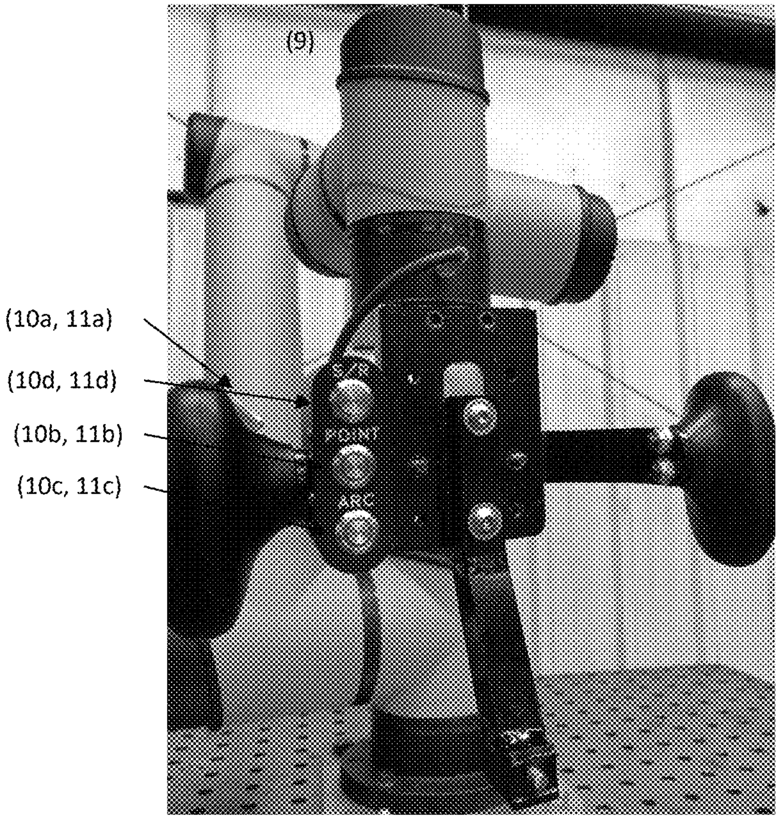
Fig. 2 Aa close-up view of the lead-through handle with input units

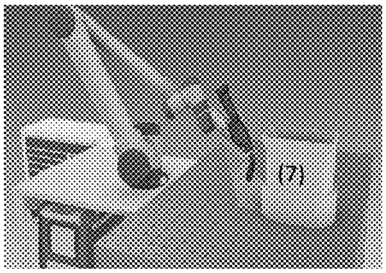
Figure 3 Robot manipulator with lead-through handle mounted on table with workpiece mounted on table

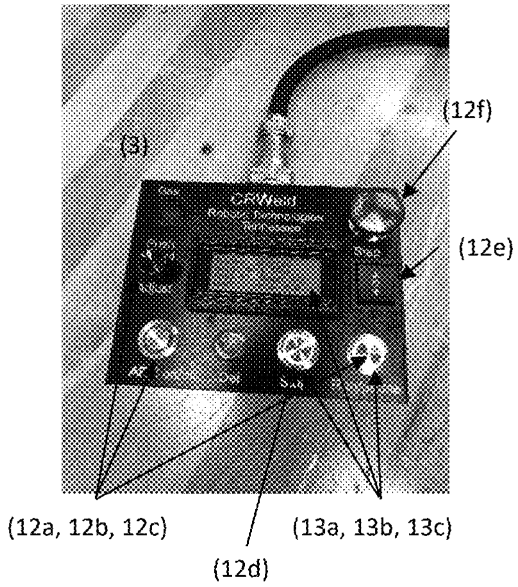
Fig. 4 Close-up view of interface box with additional input units

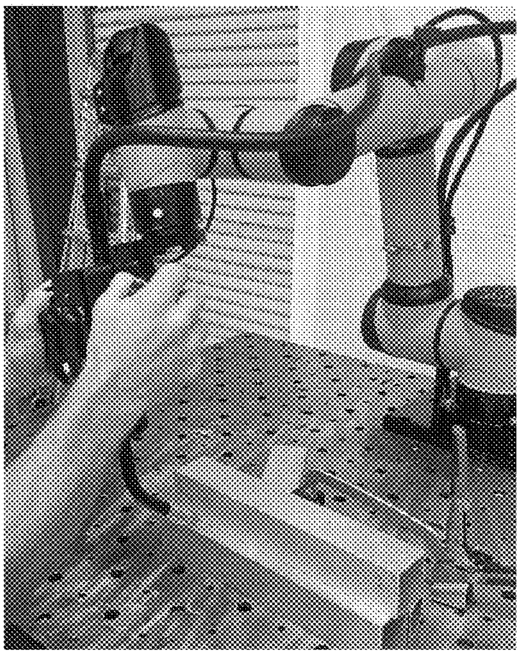
Fig 5 Robot with lead-through handle, torch and input units with an operator grasping the handle grip with a weld table and workpiece placed arbitrarily on the table.

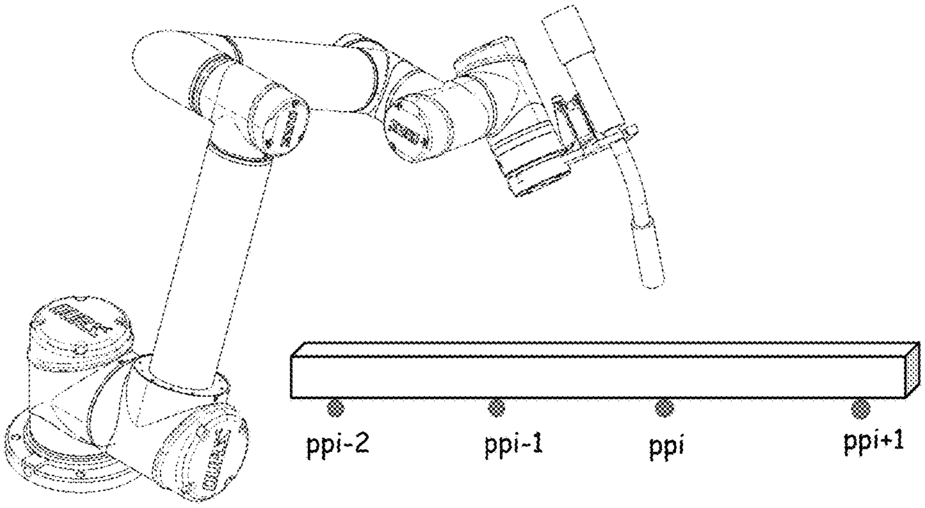
Figure 6 robot and spatially shown program points

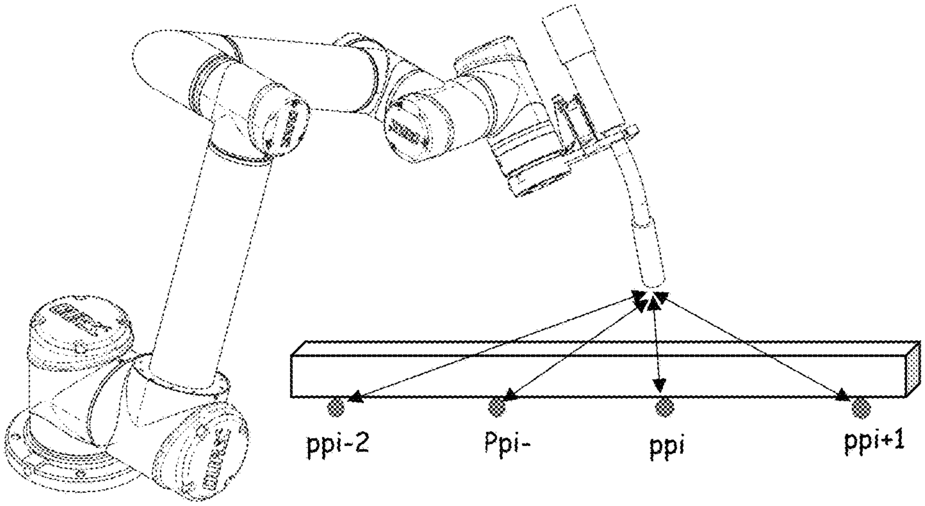
Figure 7 Robot moved to the vicinity of program point ppi

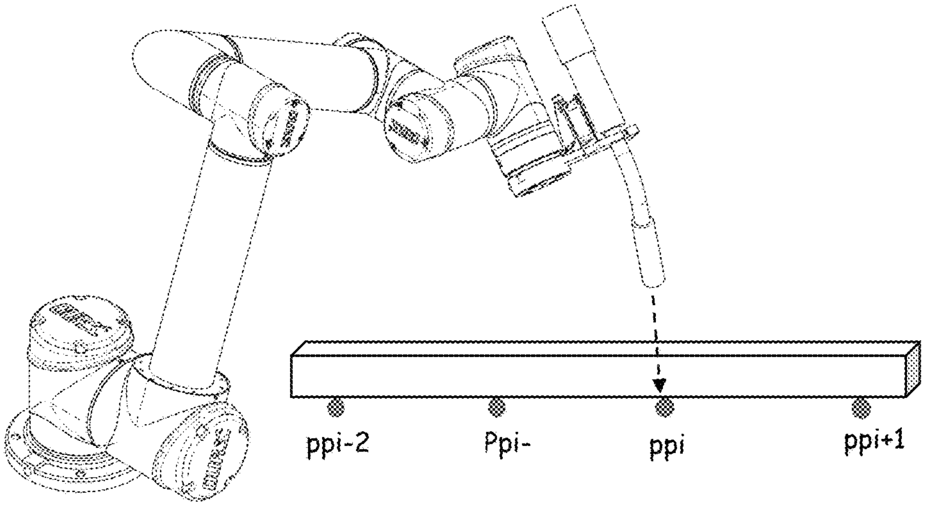
Figure 8: Robot selects the desired program point for editing

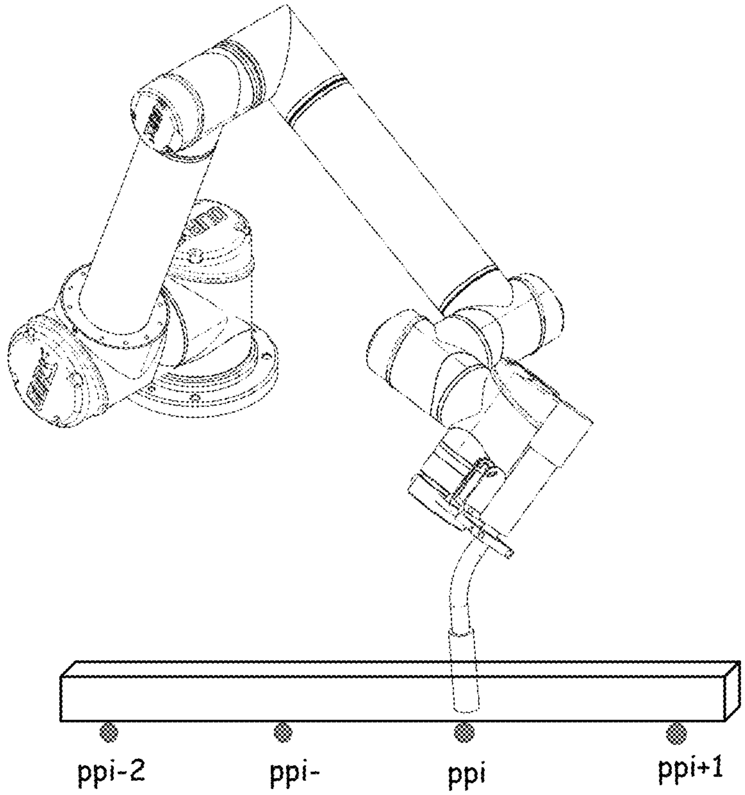
Figure 9: Robot moves to the desired program point for editing

```
G0X12Y14Z15Y14P15R16   ppi-2
M2 1 12.6
G0X12Y14Z15Y14P15R16   ppi-1
M2 1 12.6
G0X12Y14Z15Y14P15R16     ppi
M2 1 12.6
G0X12Y14Z15Y14P15R16   ppi+1
M2 1 12.6
G0X12Y14Z15Y14P15R16   ppi+2
M2 1 12.6
```

Figure 10: Program code segment with program points labeled

```
G0X12Y14Z15Y14P15R16     di-2       ppi-2
M2 1 12.6
G0X12Y14Z15Y14P15R16     di-1       ppi-1
M2 1 12.6
G0X12Y14Z15Y14P15R16     di           ppi
M2 1 12.6
G0X12Y14Z15Y14P15R16     di+1       ppi+1
M2 1 12.6
G0X12Y14Z15Y14P15R16     di+2       ppi+2
M2 1 12.6
```

Figure 11: Program code segment with distances calculated and attached to program listing

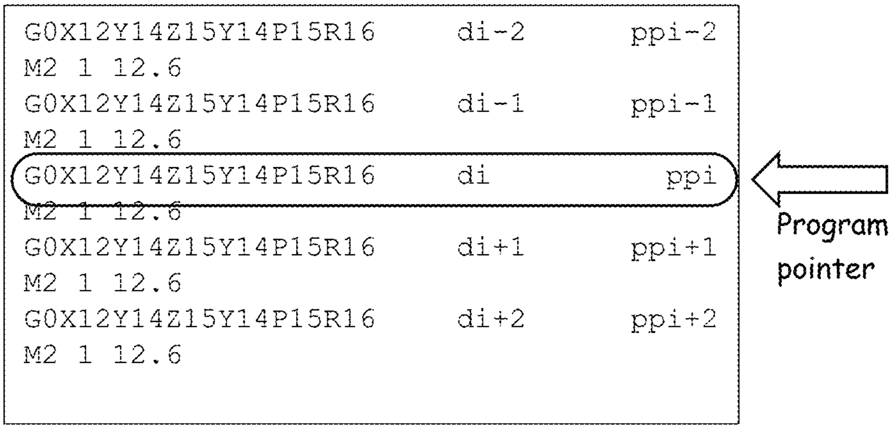
Figure 12: Program code segment with program point ppi selected as minimum distance

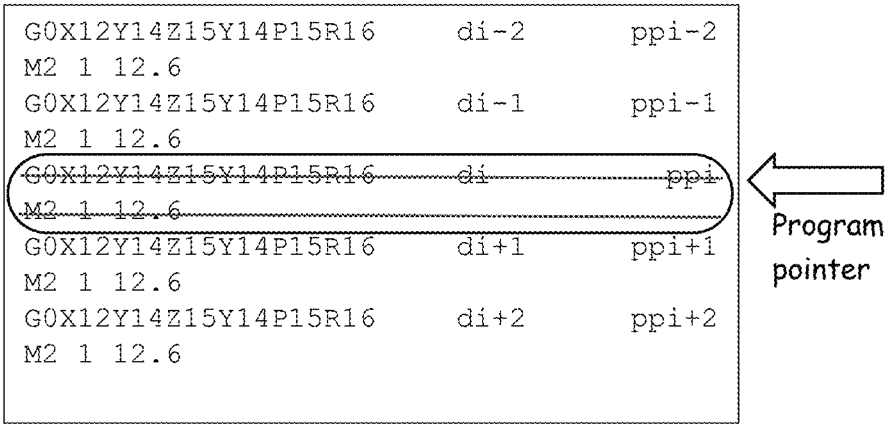
Figure 13: Deleting a program point referenced by the program counter

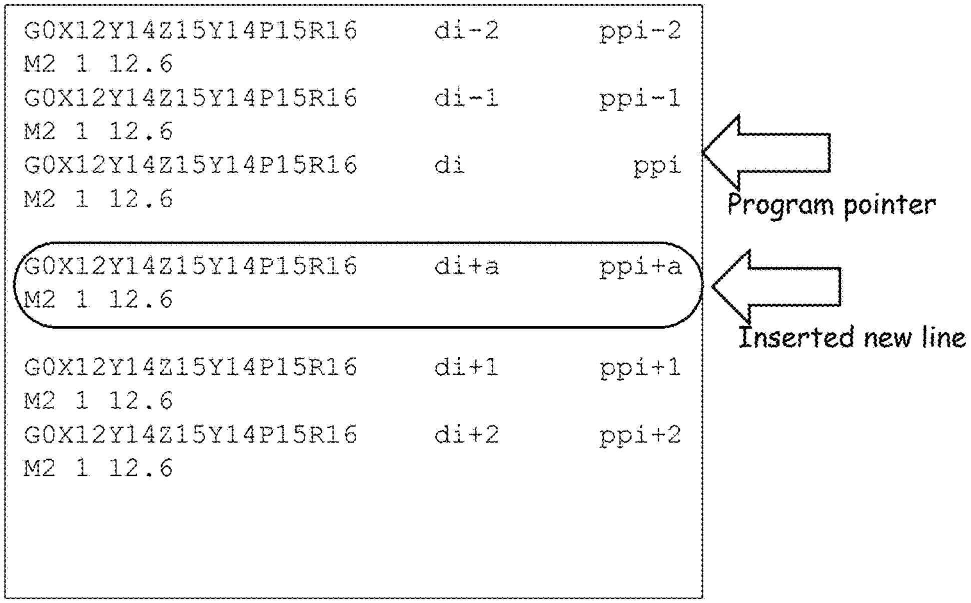
Figure 14 Adding a new program point to the program after the program point referenced by the program pointer

METHOD TO MODIFY A PROGRAM FOR ROBOTIC WELDING

STATEMENT REGARDING FEDERALLY SPONSORED RESEARCH OR DEVELOPMENT

Not Applicable

DESCRIPTION OF ATTACHED APPENDIX

Not Applicable

Background of the Invention

Robots are commonly used for automated MIG (Metal Inert Gas) welding in many industries such as automotive manufacturing. A weld procedure is defined and the robot performs motion control of the weld torch along the weld seam, while starting and stopping the arc as desired along the weld seams. In many cases, weld parameters are coordinated between the robot and the welding power supply to provide advanced weld characteristics and capabilities. In typical robotic welding applications, a fixture or jig is created to provide repeatable positioning and orienting the part, as well as to hold the part secure as the weld is performed. The weld path or operating path is defined as a collection of a finite number of successive positions and orientations (or poses) of the welding torch relative to the weld seam. The operating path will provide the desired motion to perform the weld. The complexity of programming presents an obstacle in using robotic automation in welding or other tasks for small to medium enterprises that lack resources for training or expertise in traditional robot programming strategies. This invention seeks to reduce the complexity of programming associated with robots for tasks such as welding.

Description of the Prior Art

Programming the operating path adds time to the overall manufacturing process. When the operating path is used in manufacturing large numbers of similar parts, i.e., parts that can be welded using a common operating path, the time required to program the operating path represents a small portion of the overall manufacturing cost. When manufacturing a small number of repetitive parts, the time to program the operating path can be significant. It is therefore desirable to reduce the time required to programming time. Methods used to reduce the programming time include programming successive robot positions by the lead through teaching on an actual part (U.S. Pat. No. 4,408,286), offline programming on a computer simulation of the manufacturing setup or automated robot motion programming (U.S. 60/656,435). The Teach pendant programming method is generally disclosed in U.S. Pat. No. 4,589,810. This is referred to as on-line programming method in which the programmer makes use of an interface that may include switches or a joystick to move the end effector though an operating path with respect to the actual part being manufactured. The program is constructed by recording successive positions into memory in a computer that is associated with the robot system. The recorded information consists of information that generally includes the robot position and orientation, robot speed, linear or curvilinear motion type and arc information. This information serves as a series of instructions recorded in a sequential fashion and forms a program or code that is stored into memory in a computer that is associated with the robot system. The welding robot performs a pre-programmed welding task by operating according to the instructions that are stored in the program.

Pan et al. summarize methods to improve programming methods for industrial robots (Pan, 2012). Some advances to operator-assisted online programming are described here. Improved methods for walk-through teaching include Sugita (2003) using teaching support devices that could measure the position and direction of a dummy tool and generate robot programs in robot coordinates. Choi (2001) showed a force/moment direction sensor named COSMO where operator holds the sensor and moves the robot by pushing, pulling, and twisting the sensor in the direction of the desired motion. Schraft proposed an intuitive teaching method to use a walk-through method where the user guides the robot with a handle with force torque sensor and commands the robot using a speech dialog system. The acquired trajectory can be adapted by using a 3-D graphical user interfaces.

4 This patent makes use of the Lead through teaching method as is generally disclosed in U.S. Pat. No. 4,408,286. The lead through teaching method involves teaching successive positions of the operating path by grasping or guiding the tool head directly to follow a path. The robot is moved to a specific position and orientation at specific points along the path, these specific positions and orientations are recorded in a program that resides in memory in a computer associated with the robot system. The program defines the operating path that passes through the specific points, and travels along an interpolated path between the specific points. The interpolated path could be linear, quadratic or some other interpolating function as defined by the programmer. The programmer is responsible to ensure that the robot is accurately guided to the specific points and avoids collision with objects in the workspace. The programmer also defines any additional functions that the robot will perform. These include turning the arc on or off, other arc information, the type of move (linear or curvilinear), and the speed of the tool. In the most common case, these values are numerically entered using a teach pendant. They can be also entered with buttons located on a handle associated with the robot end effector. Examples of lead-through handles that are commonly found in commercial products for robotics welding applications include grasping the robot weld torch (Yasakawa Robotiq Kinteq), or grasping a combination of the robot weld torch and robot end effector (Arc Specialties SNAPWELD). Other examples of lead through handles have been disclosed in patents including; U.S. Pat. Nos. 5,495,410, 4,408,286, 4,367,532 and 6,385,508B1.

The program memory is accessed by the robot to execute its task during the manufacturing operation. If the operator wants to modify the program, the traditional method is to access the program through some type of display device that connects to the robot system. See for example the display control unit (no. 203) that is discussed in patent JP2010190301A. The operator uses the display device to access the program, identify the location in the program to modify, make changes to the program, and finally update the program in the memory in a computer that is associated with the robot system.

The process of creating and, if needed, editing a program for robot motion requires a degree of skill and training. The program is displayed on a display device as text. The syntax and semantics of the program can be unique to the particular robot manufacturer, or in some cases can be more generalized, for example in the format of g-code. However, any of these formats require the operator to be familiar with the syntax and format of the particular program. This requires specialized training and skills not commonly associated with the skillset of welding. Further, to edit a program, the operator must be able to correlate lines of text in the program with spatial locations and functions around the workpiece. This can be difficult in some cases and requires specialized training and skills not commonly associated with the skillset of welding.

The most closely related patents are U.S. Pat. No. 6,452,134B2 in which the inventors describe a method for correcting the teaching point for a welding robot having a touch sensor using the touch sensor to detect a point on the workpieces and developing a transformation matrix based on the difference between the preset teaching points and the newly detected point. This transformation matrix then represents a correction that can be applied to one or multiple preset teaching points. Similar correction approach is shown in JP2010190301A.

CITATIONS

Publication Details Pan, Z., Polden, J., Larkin, N., van Duin, S. & Norrish, J. (2012). Recent progress on programming methods for industrial robots. Robotics and Computer Integrated Manufacturing, 28 (2), 87-94.

S. SUGITA, ET, AL, Development of robot teaching support devices to automate deburring and finishing works in casting, The International Journal of Advanced Manufacturing Technology, Springer-Verlag London, December 2003

M. H. Choi, W. W. Lee; A force/moment sensor for intuitive robot teaching application; Proceedings of IEEE International Conference on Robotics and Automation, ICRA. Page(s): 4011-4016 vol. 4, 2001.

R. D. Schraft, C. Meyer; The need for an intuitive teaching method for small and medium enterprises; 2006 ISRRobotik, Munich, Germany, May 15-18 2006

SUMMARY OF THE INVENTION

This patent defines a method for simplified programming of robot motion and simplified editing of a program for robot motion that does not require the operator to have knowledge or understanding of the particular format and syntax associated with the program used to store the path. Further, it does not require the operator to find a line in the program associated with a specific robot move on the workpiece based on the text and syntax of the program.

The method consists of two primary parts.

In the first part, the operator creates a program to define a robot task without direct knowledge or understanding of the text and syntax associated with a program. This part makes use of the Lead through teaching method as is generally disclosed in U.S. Pat. No. 4,408,286. The operator will move the robot end effector to a specific position and orientation relative to the workpiece by using a lead-through handle. The lead-through handle will allow the robot to be moved directly by the operator physically grasping and moving the end-effector. The lead through handle or a corresponding input device will then have a series of input units (such as buttons, switches or similar input devices) that can define the specific robot actions that correspond to the point in the program. For example, these may consist of the robot speed, the control of the arc function or other function associated with the tool (i.e., turn the arc on or off), the type of motion between this and the next position such as linear or curvilinear motion. In this case, the input units are clearly labeled and the operator can select the input unit according to the task component that the robot is to perform. The operator could also teach the robot information such as speed of weld by moving the robot at the desired speed. The operator does not interact with the text or syntax that forms the program that will record the information formed by the input devices and the robot position and orientation at the time these input devices are defined.

In the second part of this invention, the operator is able to edit a specific point in the program while leaving all other points in the program unchanged, without direct knowledge or understanding of the text and syntax associated with a program. The operator will first define the particular part of the program that is to be modified. All the program commands have an associated location on the workpiece or in the workspace at which the robot will create a specific position and orientation of the tool. The operator has knowledge of the location on the workpiece or in the workspace that needs to be edited or corrected. The operator will move the robot end effector to an area within the vicinity of this location on the workpiece or workspace. The operator will then select an input unit to edit the program and the robot will move to the nearest point in the robot program. This is done as follows. The program is constructed in a manner that every line has an associated position and orientation of the robot end effector. The proposed approach then performs a search, comparing the distance between the current position of end effector and the position associated with each line of the program. The approach then selects the program line that returns the minimum distance between the position of the end effector and the position associated with that particular line. Once the approach finds the associated line in the program with the minimum distance, it moves the robot to this position in the program (the one that returned the minimum distance). The operator is then able to visually affirm that this is the correct point relative to the workpiece. If not, the operator is able to repeat the process, moving the robot with the lead-through handle to a position that is near the desired corrective point on the workpiece, and pushing the input unit to perform a search with the program. Once the robot is at the correct position in the program, the operator can edit or refine this part of the program. The operator can first delete this position and its corresponding task information. The operator can then add a new position and new corresponding task information described in the process above. These steps are done using the input units on the robot end effector or other convenient location. In this manner, the program can be edited without or understanding of the particular format and syntax associated with the program.

BRIEF DESCRIPTION OF THE FIGURES

FIG. 1: Shows the robot with lead-through handle, torch and input units

FIG. 2 shows a close-up view of the lead-through handle with input units

FIG. 3 Robot manipulator with lead-through handle mounted on table with workpiece mounted on table FIG. 4 Close-up view of interface box with additional input units FIG. 5 shows the robot with lead-through handle, torch and input units with an operator grasping the handle grip with a weld table and workpiece placed arbitrarily on the table.

FIG. 6 shows the robot and spatially-shown program points

FIG. 7 Shows a robot moved to the vicinity of program point ppi

FIG. 8: Shows a robot selects the desired program point for editing

FIG. 9: Shows a robot moves to the desired program point for editing

FIG. 10: Shows a program code segment with program points labeled

FIG. 11: Shows a program code segment with distances calculated and attached to program listing FIG. 12: Shows a program code segment with program point ppi selected as minimum distance and representative equation FIG. 13 shows deleting a the program point referenced by the program pointer FIG. 14 shows Adding a new program point to the program after the program point referenced by the program pointer

DESCRIPTION OF THE INVENTION

FIG. 1 shows the robot manipulator (1), the lead-through teaching handle (2) with input units (10*a*, 10*b*, 10*c*) and input indicators (11*a*, 11*b*, 11*c*). An interface box (3) contains additional input units (12*a*, 12*b*, 12*c*) and input indicators (13*a*, 13*b*, 13*c*). A controller (4) and computer (5) is part of the robot system. The lead-through teaching handle is connect to the end of the robot. A robot tool (5) forms the robot tool and is connected to the end of the robot. The welding torch can be removed from the robot while the lead-through teaching handle remains connected to the robot. The lead-through teaching handle and the welding torch form the end-effector of the robot. The robot manipulator is shown mounted on a table (6).

FIG. 2 shows a close-up of the lead-through teaching handle. In this case, four input units are shown as momentary push buttons that provide the following; Robot drag mode (10*a*), teach a point (10*b*), toggle arc on/off (10*c*) and move to nearest program edit point (10*d*). These could also be called teach input units. Each input unit has a corresponding display LED to indicate that the function has been requested (11 *a*, 11*b*, 11*c* and 11*d* respectively). When the robot drag mode input unit is pressed, the operator is able to move the robot freely by applying small forces on the lead-through teaching handle. One manner in which this is done is by having the robot controller execute a torque feedback mode in which it adapts the robot movement to maintain only the necessary torques required to support the robot in a stable configuration.

The lead-through teaching handle could take many forms and has been demonstrated in multiple places in the literature. The lead-through teaching handle could even consist of the tool attached to the robot end-effector. The input units could take different forms including buttons, switches, pressure sensitive devices.

FIG. 3 shows the manipulator mounted on a table with one or more workpiece (7) mounted on the table.

FIG. 4 shows a close up of the interface box (3) with additional input units (12*a*, 12*b*, 12*c*) and input indicators (13*a*, 13*b*, 13*c*).

The operator creates a program to make the robot perform a specific task by teaching successive positions by grasping and directly guiding the robot end effector to follow a path or to specific points on a path. This is termed walk-through. In order to teach or record a step in the program, the operator will grasp the lead-through handle, press the robot drag mode input unit (10*a*), and now the operator is able move and guide the robot end effector to a desired position relative to the workpiece. Once the end effector is in the desired position and orientation, the operator can select the desired action at this position by pressing a corresponding input unit. For example, the operator can teach a point (10*b*) which makes the robot pass through the point, The operator can teach the robot to turn on an arc (10*c*) which causes the arc to come on at this point. Additional capability can be specified to correspond to the robot position using the interface box. The robot speed for this position can be set using input unit (12*a*). Straight line or curvilinear motion through this position can be set using input unit (12*b*). In order to help the operator determine which capability is set, display LEDs are associated with each input unit. These provide a visual signal corresponding to each input unit when selected.

FIG. 5 shows an operator guiding the robot to specific positions along the workpiece to create a program.

Once the program is created, the operator is able to start the execution of the robot program by selecting the input unit (12*c*) located on the interface box. Additional input units on the interface box can stop the program (12*d*), step through the program (12*e*) or provide an emergency stop (12*f*).

FIG. 6 shows the robot manipulator, workpiece and a series of program points ppi−1, ppi, ppi+1, ppi+2 selected from the program about program point i. A representation of the program with program points ppi−2, ppi−1, ppi, ppi+1, ppi+2 is shown in FIGS. 10, 11. The program is stored in the computer memory associated with the robot system. These figures show a generic representation of the program. The program positions contain information about robot position, other motion characteristics (velocity, acceleration, blends), as well as other functions such as controlling arc, tools or creating delays. In many cases, programs for a robot task will require editing. A description of a method to allow the operator to edit one or multiple parts of the program while leaving all other points in the program unchanged, without direct knowledge or understanding of the text and syntax associated with a program is provided. An example syntax of a program is shown in FIG. 11. The operator will first define the particular part of the program that is to be modified. The operator will do this by observing the workspace and selecting a position in the workspace where the program should be edited. For example from FIG. 6 assume the operator selects program point ppi for editing. All the program commands have an associated location on the workpiece to which the robot will create a specific position and orientation of the tool. The operator has knowledge of the location on the workpiece that needs to be edited or corrected. For example in FIG. 6 the operator intends to modify the portion of the program that meets the workpiece at ppi. The operator will move the robot end effector to an area within the vicinity of this location on the workpiece. This is shown in FIG. 7. The operator will then select an input unit to edit the program and the robot will move to the nearest point in the robot program. As an example, the input unit (10*d*) located on the lead-through handle can initiate this event.

The method in which the robot system determines the closest program position, ppi, is described as follows.

The program is constructed of a sequence or series of successive program positions. This is shown in FIG. 10 with successive program positions labeled as ppi−2, ppi−1, ppi, ppi+1, ppi+2. The program is constructed in a manner that each program position has an associated position and orientation of the robot end effector. Each program position also has associated functions that occur at this corresponding position and orientation of the robot. These can include making the robot pass through a point, turning a tool on or off, or turning a weld arc on or off, the robot speed at this position, and straight line or curvilinear motion through this position.

The method then calculates the Euclidean distance between the position of the robot end-effector and every point in the program, shown as di−2, di−1, di, di+1 on FIG. 7. These distances are correspond to program points in the program as shown in FIG. 11. The method then performs a search on the distance associated with each point in the program and selects the program line that returns the minimum distance between the position of the end effector and the position associated with that particular line (program point i or ppi). An example of the calculation is to find program point ppi that minimizes the distance to the robot torch, $$di = |q - ppi| = \sqrt{(q_1 - ppi_1)^2 + (q_2 - ppi_2)^2 + \ldots + (q_n - ppi_n)^2}$$

Where $d_i$ is the distance, q is the current robot position, ppi is the position at the program point i and $q_j$ corresponds to component j of vector q. The error can be based purely on position of the tool tip (x,y,z defined in a selected coordinate frame) or based on an error in the complete pose. If comparing pose, a few options are available and can be implemented. One would be to define the pose as a combination of x,y,z position and selected Euler angle set or quaternions. The units selected for the position and angles are up to the designer. Alternatively, the pose error could be defined as a combination of difference in position and difference in orientation defined as $$s(Q_{robot}) * Q_{robot}^T Q_{pp} s$$

where $Q_{robot}$, $Q_{pp}$ are the rotation operators describing the orientation of the robot and program point respectively and s(Q) is the skew symmetric vector of Q.

It should be noted that an alternative to Euclidean distance as defined above could be used to select the desired program position.

The result of this search is shown in FIG. 8 for the robot selecting the closest program point in space and is shown in FIG. 12 for the program selecting the corresponding program point in syntax. Once the algorithm finds the associated line in the program with the minimum distance, it locates that program position in memory with a program pointer. It will also move the robot to the program position referenced by the program pointer, (the one that returned the minimum distance, ppi) as shown in FIG. 9 and the approach moves a program counter or program pointer to the program point ppi (FIG. 12) so that any changes the operator makes will change this point in the program. The robot is driven through automatic control moving as widely accepted in the literature and engineering practice; see for example one of the original patents that describe the automatic motion control procedure for a robot in U.S. Pat. No. 2,988,237A, claim 1 and a more recent description in U.S. Pat. No. 8,620,473 B2 claim 1. The robot is driven through automatic control moving by commanding the selected program position as the desired position for the robot end effector and then automatic control moving means to drive the robot and end-effector to this position. Once the robot has moved to position ppi, the operator is able to visually affirm that this is the correct point relative to the workpiece. If not, the operator is able to repeat the process, moving the robot with the lead-through handle to a position that is near the desired corrective point on the workpiece, and pushing the input unit to perform a search with the program. Once the robot is at the correct position in the program, the operator can edit or refine this part of the program. The operator can delete this program position and its corresponding task information. Once the program position is deleted, the program pointer will reference the next program position in the program. The operator can move continue to delete successive points in the program if desired.

Alternatively, the operator can then add a new position and new corresponding task information described in the process above. Once the operator has manually moved to a location in the workspace to modify the program, and the algorithm finds the desired program position, the operator is able to add a new position. They do this by moving the robot to a new position and recording this position. This new position is added to the program immediately following the program position.

In this manner, the program can be edited by adding, deleting or both adding and deleting program positions in the program without or understanding of the particular format and syntax associated with the program. FIG. 13 shows the process of deleting the program point referenced by the program counter. FIG. 14 shows the process of adding a new program point after the program point referenced by the program counter.

The robot can be guided manually or by using an input device that will guide the robot motion based on inputs to the robot motors or actuators. When adding new program positions to the program, it may be desirable to fine-tune the position or motion of the end-effector. This can be done by moving the end-effector manually, but in some cases this may be difficult to achieve fine resolution in the motion when moving the robot manually. A six degree of freedom joystick located on or near the end-effector (item (9), FIG. 1) can allow the operator to move the end-effector with fine precision. The joystick is oriented in a manner that pushing the joystick in a particular direction will cause the end-effector to move in that same direction. The joystick does this by commanding positions in a frame attached to the end-effector and using the robot inverse kinematic algorithms to transform these positions into joint space positions to be sent to the robot controller. This makes for an intuitive means to provide fine positioning control of the end effector. The response of the end-effector to joystick motion can be programmed for different motion rates. This motion rate can change in time such that when the operator first pushes on the joystick, slow motion of the end-effector results for the highest resolution motion. If the operator continues to push the joystick in the same direction for a longer period of time, the motion rate can increase to move the end-effector at a faster rate of speed.

An additional aid to an operator to make program editing more intuitive is described. When creating or editing a program, the operator may need to move the end effector to a precise orientation relative to the workpiece. This precise orientation may take time to achieve using manual guiding, the end-effector joystick or other means. In many cases, this precise orientation will need to be repeated at multiple program positions in the program. A means to store and recall the current orientation of the end-effector is created. This means consists of the following. A desired precise orientation is given to the robot end-effector by the operator using manual guiding, end-effector joystick guiding or in another way. An input unit associated with storing the orientation is selected by the operator (for example 10*d*, FIG. 2). An algorithm stores this precise orientation in a temporary portion of the program memory. The orientation can be saved as a quaternion, a selected Euler angle set or other method. The operator can then move the robot end effector to another position. When the operator wants the stored precise orientation of the end-effector at the new position, the operator selects an input unit associated with recalling the stored orientation (for example 10*d*, FIG. 2). The algorithm then retrieves the previously stored precise orientation from the temporary potion of program memory. It combines this orientation with the current robot end-effector position and then sends this full position and orientation command to the robot control to move the end-effector. In this way, the new end-effector position is maintained by the orientation of the end-effector now matches the one previously stored.

The program positions consist of the position and orientation of the end effector as well as other information that defines the robot motion at that program position. This other information could include robot speed or What is claimed is:

What is claimed is:

1. A method for editing a program for the operation of a robot comprising the steps of:

manually moving an end effector of the robot near a program position to be edited, computing a distance between the position of the end effector of the robot and all program positions contained in the program, searching the program for the program position that yields a minimum of the distance, and automatic control moving the end effector of the robot to the program position having the minimum distance.

2. The method for editing a program for the operation of a robot according to claim 1 further comprising the step of referencing the program position having a minimum of the distance.

3. The method for editing a program for the operation of a robot according to claim 2 further comprising the steps of, deleting the program position having a minimum of the distance, and storing the program with the program position having a minimum of the distance deleted from the program.

4. The method for editing a program for the operation of a robot according to claim 2 further comprising the steps of, adding a new program position to the program, the new program position to be added to the program after the program position having a minimum of the distance, selecting an input unit for adding the new program position to the program, and storing the program with the new program position to be added to the program after the program position having a minimum of the distance.

5. The method for editing a program for the operation of a robot according to claim 1 in which the distance is further defined to be calculated as a Euclidean distance.

6. The method for editing a program for the operation of a robot according to claim 1 further comprising the step of moving, using an end-effector joystick that allows precise motion of the end-effector corresponding to motion of the end-effector joystick.

7. The method for editing a program for the operation of a robot according to claim 1 further comprising the steps of, storing a desired end-effector orientation, using an input unit to store the desired end-effector orientation in a temporary portion of a program memory, recalling the stored desired end-effector orientation, using a second input unit to recall the desired end-effector orientation, and automatic control moving the robot to a position and orientation consisting of the program position having the minimum distance and the recalled desired end-effector orientation.

* * * * *